US011394558B2

(12) United States Patent
Chen et al.

(10) Patent No.: US 11,394,558 B2
(45) Date of Patent: Jul. 19, 2022

(54) SEGMENT-BASED FILE AUTHENTICATION

(71) Applicant: IGT, Las Vegas, NV (US)

(72) Inventors: Xuedong Chen, Reno, NV (US); Bosi Wang, Reno, NV (US)

(73) Assignee: IGT, Las Vegas, NV (US)

( * ) Notice: Subject to any disclaimer, the term of this patent is extended or adjusted under 35 U.S.C. 154(b) by 358 days.

(21) Appl. No.: 16/579,044

(22) Filed: Sep. 23, 2019

(65) Prior Publication Data

US 2021/0091959 A1 Mar. 25, 2021

(51) Int. Cl.
*H04L 9/32* (2006.01)
*G06F 8/61* (2018.01)

(52) U.S. Cl.
CPC .............. *H04L 9/3247* (2013.01); *G06F 8/63* (2013.01); *H04L 9/3236* (2013.01); *H04L 9/3268* (2013.01)

(58) Field of Classification Search
CPC ... H04L 9/3247; H04L 9/3236; H04L 9/3268; H04L 9/3263; G06F 8/63; G06F 2221/2109; G06F 21/575; G06F 21/51; G06F 21/44

See application file for complete search history.

(56) References Cited

U.S. PATENT DOCUMENTS

| | | | |
|---|---|---|---|
| 8,417,954 B1* | 4/2013 | Sagal | H04L 9/3263 713/176 |
| 2010/0130287 A1* | 5/2010 | Dasgupta | G07F 17/3241 463/44 |
| 2011/0138164 A1* | 6/2011 | Cha | H04N 21/4432 713/2 |
| 2020/0334028 A1* | 10/2020 | Suryanarayana | G06F 3/0641 |

* cited by examiner

*Primary Examiner* — Nelson S. Giddins
(74) *Attorney, Agent, or Firm* — Sage Patent Group

(57) ABSTRACT

Provided are servers and methods for authenticating software files. A server includes a processor circuit and a memory coupled to the processor circuit. The memory includes computer program instructions that, when executed by the processor circuit, cause the authentication server to perform operations including verifying, using a public key, signature data corresponding to a single certificate file for authenticating a software installation package file that was signed using a private source key. Operations may include, responsive to verifying that the signature data matches an originally signed single certificate file, reading an image file segment table from the software installation package file. The image file segment table includes multiple records that correspond to ones of multiple image file segments of the software installation package file.

16 Claims, 14 Drawing Sheets

SEGMENT-BASED FILE AUTHENTICATION

FIELD

Embodiments described herein relate to systems, methods and computer program products for authenticating large software files such as software package files.

BACKGROUND OF THE DISCLOSURE

A device, such as a device that includes a server or other processing circuit, may operate based on an image file that is generated on a different server and that is transferred to the device. For example, the device may be an electronic gaming machine (EGM) and the image file may include all of the software components that are already preconfigured for use in the therein. Examples of an image file include an operation system, a game system, a foundation system and/or a feature system.

The image file may be built by the server and then a certificate may be generated to ensure that the image file to be installed and launched on the EGM is the same as the image file that is generated by the server. Generating the certificate may include digitally signing the image file using a hashing algorithm to generate a digital digest of the image file and signing the digital digest with a supplier-specific non-public encryption key. The signature file and digital digest may be combined to generate the certificate and may be submitted to regulators for approval.

The process of installing and launching the image file on the device may generally be a reverse of the building operations. For example, the certificate file may be opened and a public key may be used to decrypt the signature file therein. The image file might be hashed with the same hash algorithm used in the image building and the resultant hash value is compared with the digital digest that was generated during the image file build. Since image files may be extremely large and the hashing algorithm may be run on the image files in a substantially serial manner, this operation may be time and processor intensive.

BRIEF SUMMARY OF THE DISCLOSURE

Some embodiments are directed to a server. A server according to such embodiments may include a processor circuit and a memory coupled to the processor circuit. The memory includes computer program instructions that, when executed by the processor circuit, cause the server to perform operations including verifying, using a public key, signature data corresponding to a single certificate file for authenticating a software installation package file that was signed using a private source key. Operations include, responsive to verifying that the signature data matches an originally signed single certificate file, reading an image file segment table from the software installation package file. The image file segment table includes multiple records that correspond to ones of multiple image file segments of the software installation package file.

Some embodiments herein are directed to a server that includes a processor circuit and a memory coupled to the processor circuit. The memory includes computer program instructions that, when executed by the processor circuit, cause the server to perform operations including scanning an image file that corresponds to a software installation package file to identify multiple image file segments therein and generating a single certificate file that corresponds to the multiple image file segments.

Some embodiments herein are directed to methods that include dividing an image file that corresponds to a software installation package file into multiple image file segments, hashing ones of the image file segments into corresponding segment digital digest values, generating an image file segment table that includes records corresponding to each of the image file segments, combining the segment digital digest values into a combined segment digital digest value, hashing the combined digital digest value to generate a hashed combined segment digest value, and generating a single certificate file by digitally signing the hashed combined segment digest value using a private source key.

DETAILED DESCRIPTION OF THE DISCLOSURE

Figure 1:
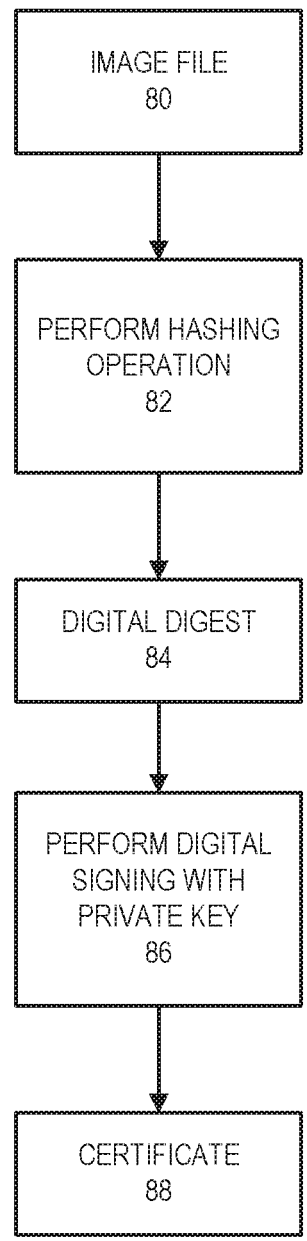
FIG. 1 is a block diagram illustrating preparing an image file for authentication.

Embodiments of the inventive concepts provide devices and methods for authenticating image files for electronic gaming machines (EGM's) and/or other devices that include servers. Presently, all image files (including Operating System, Foundation, Games and feature packages) may be required to be successfully authenticated before they can be launched at run time. The authentication process may be the most time consuming portion of gaming machine boot up. Embodiments herein address the technical problem corresponding to the delay corresponding to authentication of image files by generating multiple file segments from the image files and performing at least a portion of the authentication on the different segments.

Currently, the image file is hashed to generate a File Verification Table (FVT) file, which will be signed by private key to obtain the certificate. The pair of the image file and its certificate file will be submitted for approved and be deployed in the field.

Authentication of the image file may be the reverse operation of its image preparation. First, the signature is verified to retrieve its signed hash using the public key. Then the image is hashed with the same algorithm to get the actual hash. Finally, the calculated hash is compared to the retrieved hash to determine if the file is intact.

In some embodiments, by defining the image file into segments, multiple threads corresponding to multiple CPU cores may be used to authenticate a single image file. Further, some embodiments may hash all of the image file content without differentiation. This may include segments of repeatable bytes, which may be processed using a compare function instead of a hashing function. Thus, CPU cycles may be reduced.

Some embodiments provide that the image file is scanned to divide it into multiple segments. The multiple segments may include segments having repetitive bytes, such as, for example, regions full of 0x00, 0xff and/or 0x55, among others. According to embodiments herein, repetitive bytes may include bytes or sets of bytes having different values that are repeated therein. In addition to repetitive byte segments, the image file segments may include non-repetitive data that may be referred to as regular image segments.

For each segment, a record including the following structure may be generated:

```
enum class BlockType : std::uint8_t
{
    REGULAR_IMG = 0,
    REPEATITIVE_IMG
};
TYPEDEF STRUCT
{|
    BlockType type;
    std::uint64_t start_offset;
    std::uint64_t size;
    // The whole block will only contain the first byte if the type is
    REPEATITIVE_IMG.
    // Otherwise the whole 32 bytes would be the SHA256 hash for
    the regular image block.
    std::array <std::uint8_t, 32> hash_digest;
}BlockInformation;
```

In some embodiments, all of the image file segments contain the start_offset, which identifies the beginning point in the image file that corresponds to the corresponding image file segment. Additionally, record includes the size of the image file segment. For image file segments that only contain repetitive bytes, the record contains the value of repetitive bytes that may be stored at the first byte of hash_digest. For non-repetitive image file segments the record may contain the actual hash value of the image file segment.

An image file segment table containing the records for all the image file segments is generated. This table is then hashed again to generate its own digital digest, which may be signed with a private key to generate the signature. The combination of the above table and the signature will result in a certificate.

During authentication, an authenticating server and/or process will determine the signature from the certificate and verify the signature using a corresponding public key. Once the signature is successfully verified, the authenticating server will retrieve the image file segment table, and launch multiple processing threads based on the number of CPU cores as well as the number of segments recorded in the image file segment table.

For image file segments that contain non-repetitive image data, the corresponding processing thread will hash the image based on the start_offset and size that are in the record, and compare the calculated hash value against the hash value in the record to determine if the data in that segment has been altered in any way. For the segment with repetitive bytes, the processing thread will perform a byte by byte comparison to ensure that segment only contains the repetitive byte and nothing else. Comparing the bytes may be less processor intensive than performing a hashing operation with no degradation in security. Further, in contrast with performing a hashing operation on the entire image file using a single processing thread, embodiments herein may be performed using multiple processor cores simultaneously to hash the image file segments. Thus, the image file may be more quickly authenticated relative to non-segmented approaches.

Brief reference is now made to FIG. 1, which is a block diagram that illustrates operations for preparing an image file for authentication. Operations include performing a hashing operation (block 82) on an image file 80 to generate a digital digest 84. The digital digest 84 may include a hash value of the image file 80 that may be generated using any of a number of different hashing algorithms. One example includes the SHA256 algorithm, but this example is non-limiting. A digital signing may be performed (block 86) on the digital digest 84 to generate a certificate 88 that may be used later to authenticate the image file prior to installation and/or launch.

Figure 2:
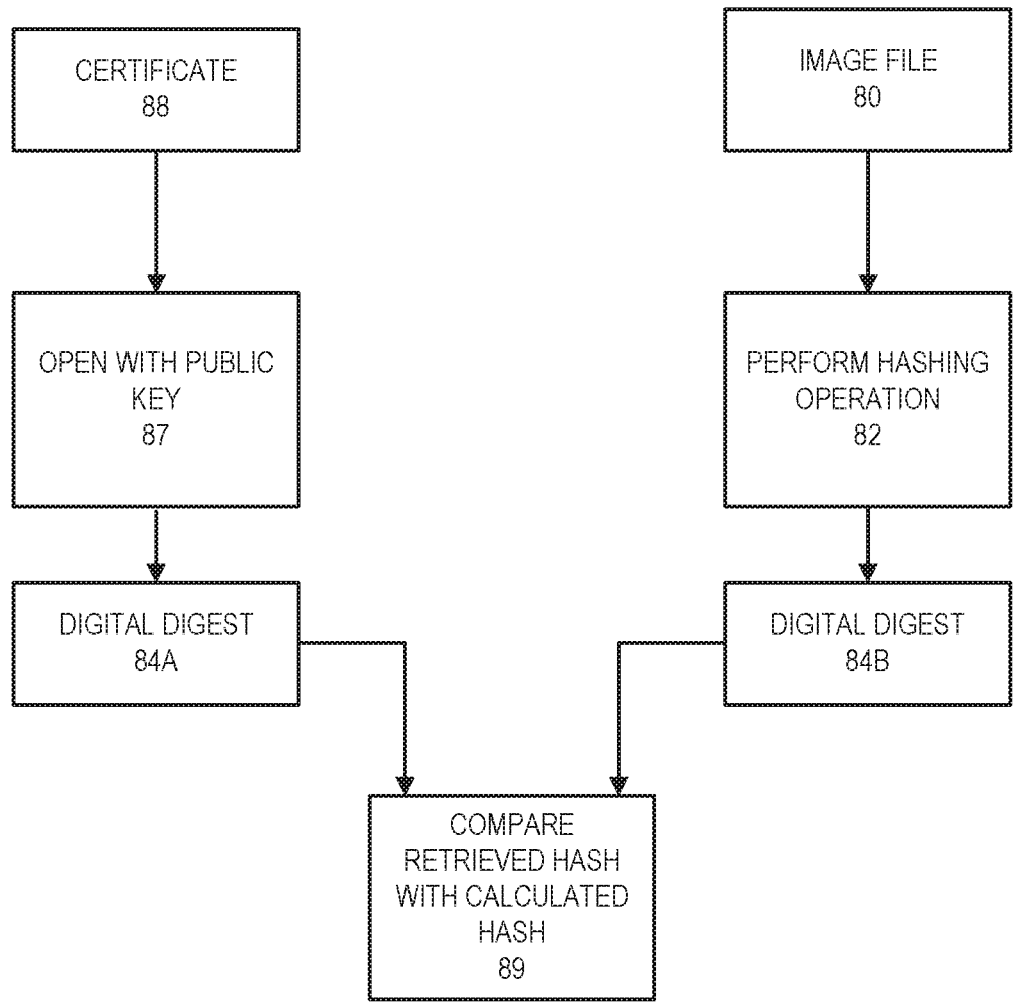
FIG. 2 is a block diagram illustrating authenticating an image file.

Brief reference is now made to FIG. 2, which is a block diagram illustrating authenticating an image file. The certificate 88 that were generated in the operations of FIG. 1 is opened with a public key that corresponds to the private key (block 87) and the digital digest 84A is retrieved. A hashing operation 82 is performed on the image file 80 that is to be authenticated to calculate the digital digest 84B. The retrieved digital digest 84A and the calculated digital digest 84B are compared to one another (block 89). If there is any difference between the retrieved digital digest 84A and the calculated digital digest 84B, then the image file has been altered. If the retrieved and calculated digital digests are the same than the image file may be authenticated.

Figure 3:
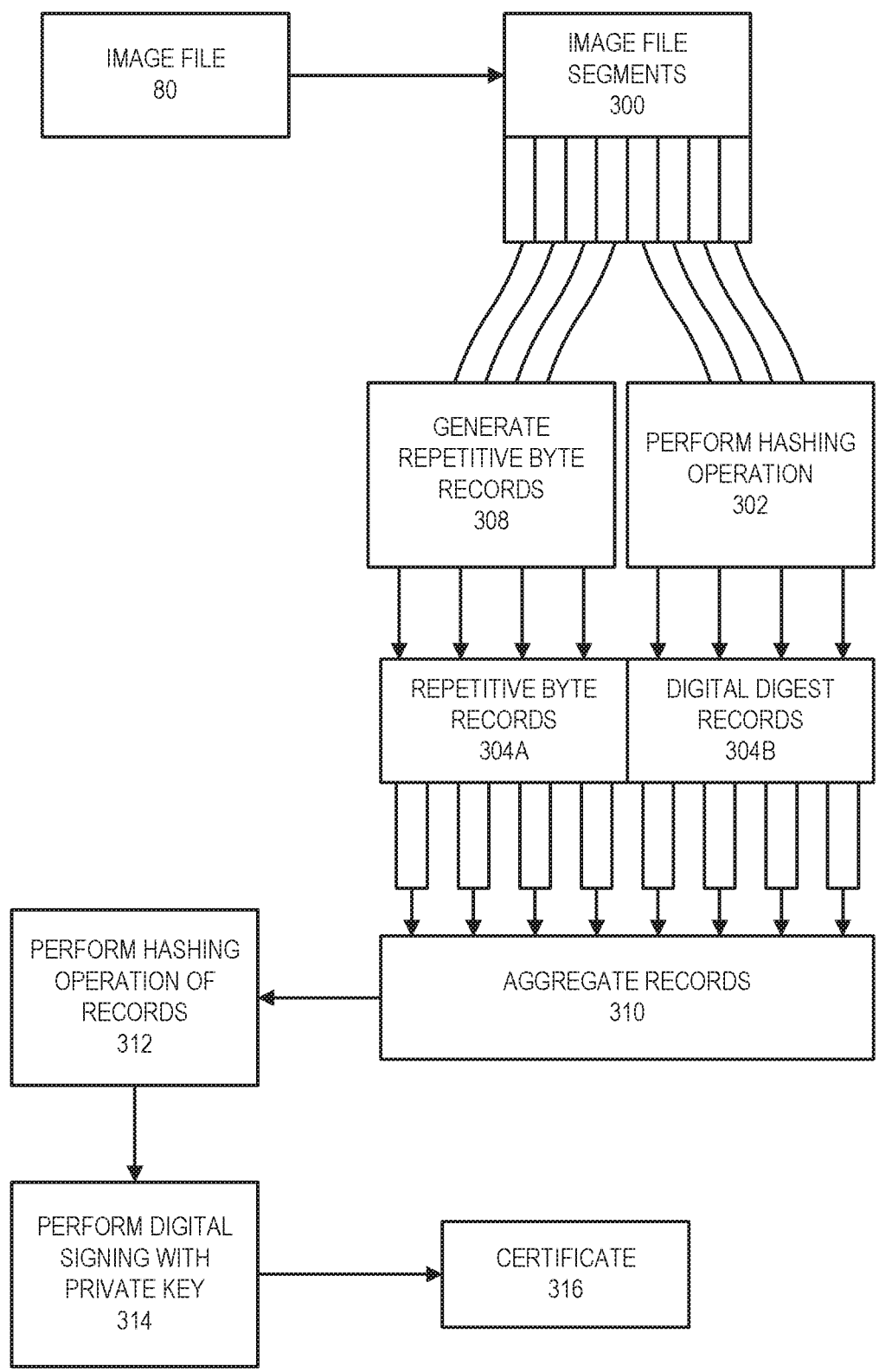
FIG. 3 is a block diagram illustrating segmenting an image file for authentication according to some embodiments.

Reference is now made to FIG. 3, which is a block diagram illustrating segmenting an image file for authentication according to some embodiments. An image file 80 may be scanned to identify define divisible portions thereof that may be defined multiple image file segments 300. In some embodiments, the image file segments 300 may include image file segments that include nothing but a repeated value. Such image file segments may be referred to as repetitive segments. Other image file segments may include non-repetitive data.

For the repetitive image file segments, operations may include generating (block 308) repetitive byte records 304A that may include data corresponding to the individual segments. For the non-repetitive file segments, operations may include performing a hashing operation (block 302) on each of these segments. The result of the hashing operations will be corresponding digital digests that may be included in respective digital digest records 304B.

The repetitive byte records 304A and the digital digest records 304B may be aggregated (block 310) and a hashing operation may be performed on the combined value of the repetitive byte records 304A and the digital digest records 304B (block 312). The hash value from the hashing of the records may be digitally signed using a private key (block 314) and a certificate may be generated (block 316).

Figure 4:
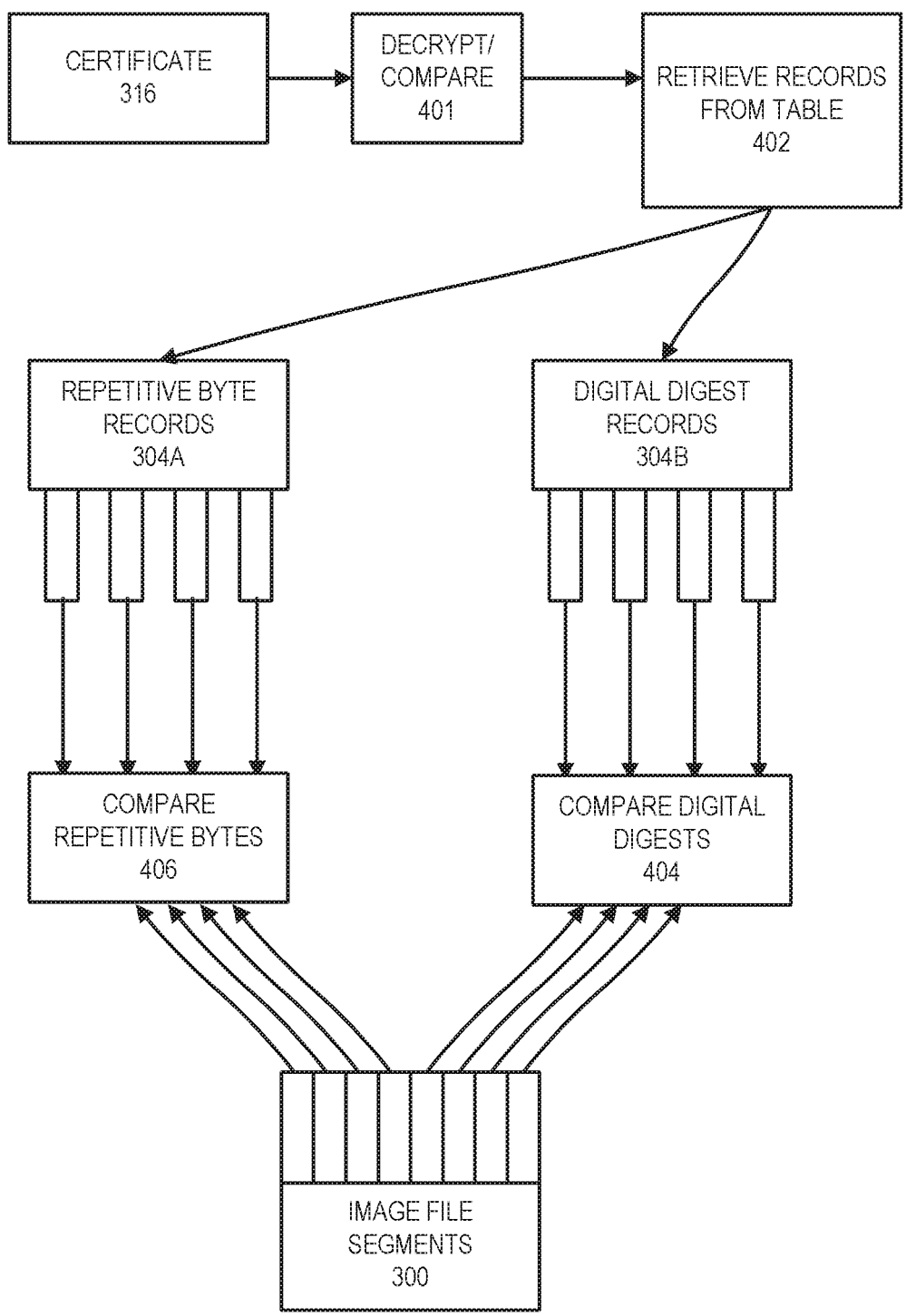
FIG. 4 is a block diagram illustrating authenticating a segmented image file according to some embodiments.

Reference is now made to FIG. 4, is a block diagram illustrating authenticating a segmented image file according to some embodiments. In the authentication of an image file that is prepared according to the operations of FIG. 3, the certificate 316 is accessed and the records are retrieved from an image file segment table (block 402). Some embodiments provide that decrypt/compare operations (block 401) are performed. For example, a decryption operation may retrieve a hash corresponding to the aggregate records 310 and perform a hashing operation on the aggregate records 310. The retrieved hash and the computed hash may be compared to determine that the aggregate records have not been modified. The retrieved records may include repetitive byte records 304A and digital digest records 304B.

The segment information in the records that are in the image file segment table are used to identify the image file segments 300 in the image file that is being authenticated. For the segments that correspond to repetitive byte records 304A, the repetitive bytes corresponding to the records in the table are compared to the repetitive bytes in the corresponding image file segments.

Similarly, the image file segments in the image file being authenticated are hashed and the digital digests are compared to those in the digital digest records from the image file segment table. If any of the comparisons corresponding to any of the segments indicated a difference, then the file has been modified and is not authenticated. In contrast, if all of the comparisons indicate no difference, then the image file may be authenticated.

Figure 5:
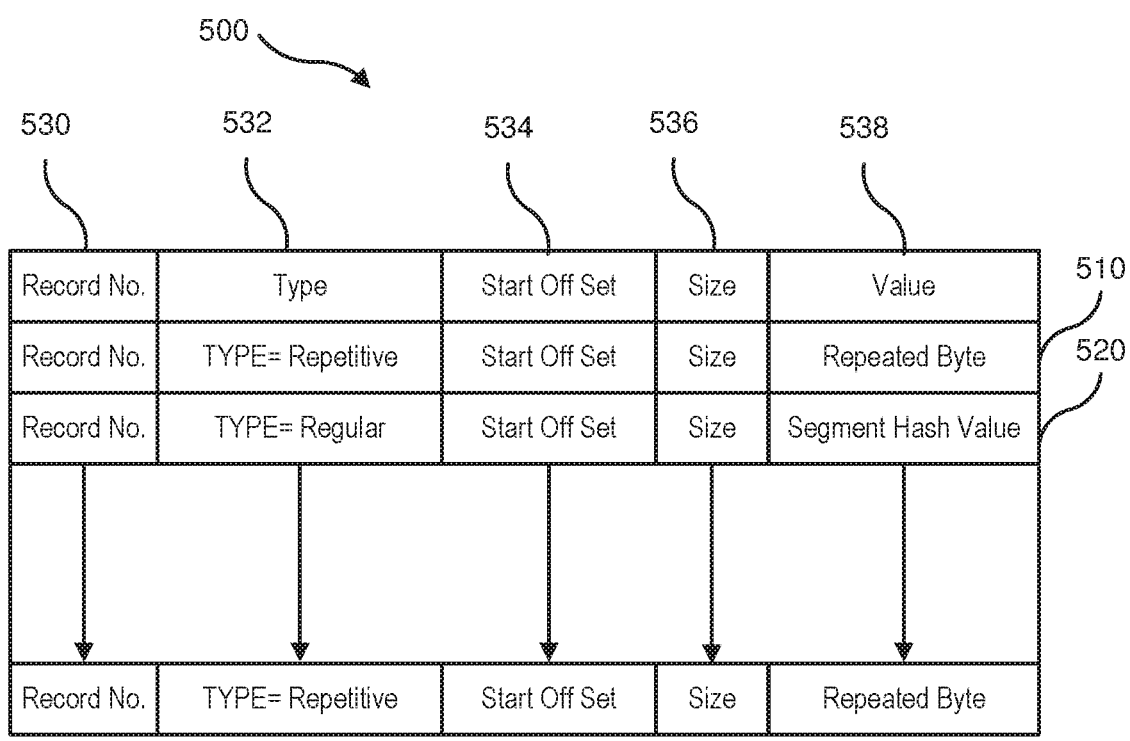
FIG. 5 is a block diagram illustrating an image file segment table according to some embodiments.

Brief reference is now made to FIG. 5, which is a block diagram illustrating an image file segment table according to some embodiments. Some embodiments provide that the image file segment table 500 may include a plurality of records that each include data fields corresponding to the different segments therein. Each record may include a record number field 530 that is unique to each record relative to the other records. A "Type" field 532 may stored a value that identifies whether the record corresponds to a repetitive byte segment or a non-repetitive byte (regular) segment. A "Start Off Set" field 534 may include a value that identifies the starting point of the image file segment within the image file. The "Size" field may include a value that identifies the size of the image file segment. A "Value" field may include the segment hash value for non-repetitive image file segments and the repeated byte value for repetitive byte image file segments.

As illustrated, a first record 510 may correspond to a repetitive byte segment while second record 520 may correspond to a non-repetitive byte segment.

Figure 6:
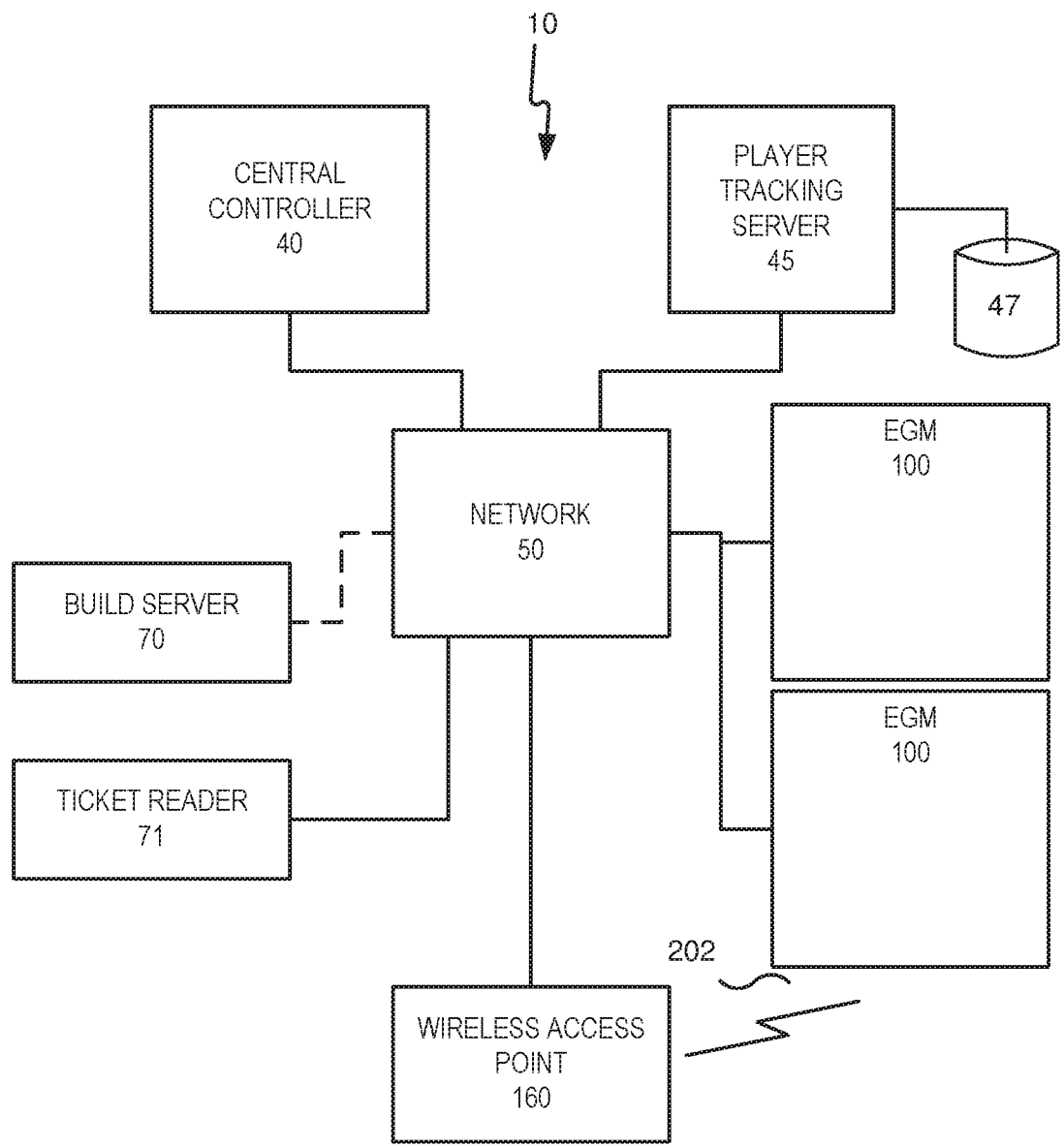
FIG. 6 is a schematic block diagram illustrating a network configuration according to some embodiments.

Referring to FIG. 6, a system 10 including a plurality of EGMs 100 is illustrated. The system 10 may be located, for example, on the premises of a gaming establishment, such as a casino. The EGMs 100, which are typically situated on a casino floor, may be in communication with each other and/or at least one central controller 40 through a data network or remote communication link 50. The data communication network 50 may be a private data communication network that is operated, for example, by the gaming facility that operates the EGM 100.

Communications over the data communication network 50 may be encrypted for security. The central controller 40 may be any suitable server or computing device which includes at least one processor and at least one memory or storage device. Each EGM 100 may include a processor that transmits and receives events, messages, commands or any other suitable data or signal between the EGM 100 and the central controller 40. The EGM processor is operable to execute such communicated events, messages or commands in conjunction with the operation of the EGM. Moreover, the processor of the central controller 40 is configured to transmit and receive events, messages, commands or any other suitable data or signal between the central controller 40 and each of the individual EGMs 100. In some embodiments, one or more of the functions of the central controller 40 may be performed by one or more EGM processors. Moreover, in some embodiments, one or more of the functions of one or more EGM processors as disclosed herein may be performed by the central controller 40.

A wireless access point 160 provides wireless access to the data communication network 50. The wireless access point 160 may be connected to the data communication network 50 as illustrated in FIG. 6, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

In some embodiments, the system 10 includes a build server and/or receives an image file that is generated by a build server 70. The build server 70 may be in direct and/or indirect communication with the system 10. For example, the build server 70 may be a computing system that communicates through the data communication network 50 with the EGMs 100 to provide image files that may be installed in one or more of the EGMs 100. In some embodiments, the image files are provided to a regulator for approval and then, once approved, sent to the system 10, including the EGMs 100 for installation thereon. The build server 70 may be implemented within or separately from the central controller 40.

The build server 70 may be configured to generate the image file record table, signature and the certificate. The EGM's 100 may include the authenticating server that performs operations described herein for authenticating the image file.

In some embodiments, the build server 70 may communicate directly and/or indirectly with an EGM 100 over a wireless interface 202, which may be a WiFi link, a Bluetooth link, an NFC link, etc. In other embodiments, the build server 70 may communicate with the data communication network 50 (and devices connected thereto, including EGMs) over a wireless interface 202 with the wireless access point 160.

In some embodiments, operations corresponding to the build server 70, the central controller 40 and/or the EGM 100 may be performed by a server that includes a processing device and a memory. The memory may be configured to store computer readable instructions that, when executed, cause the processing device to perform operations described herein.

Figure 7A:
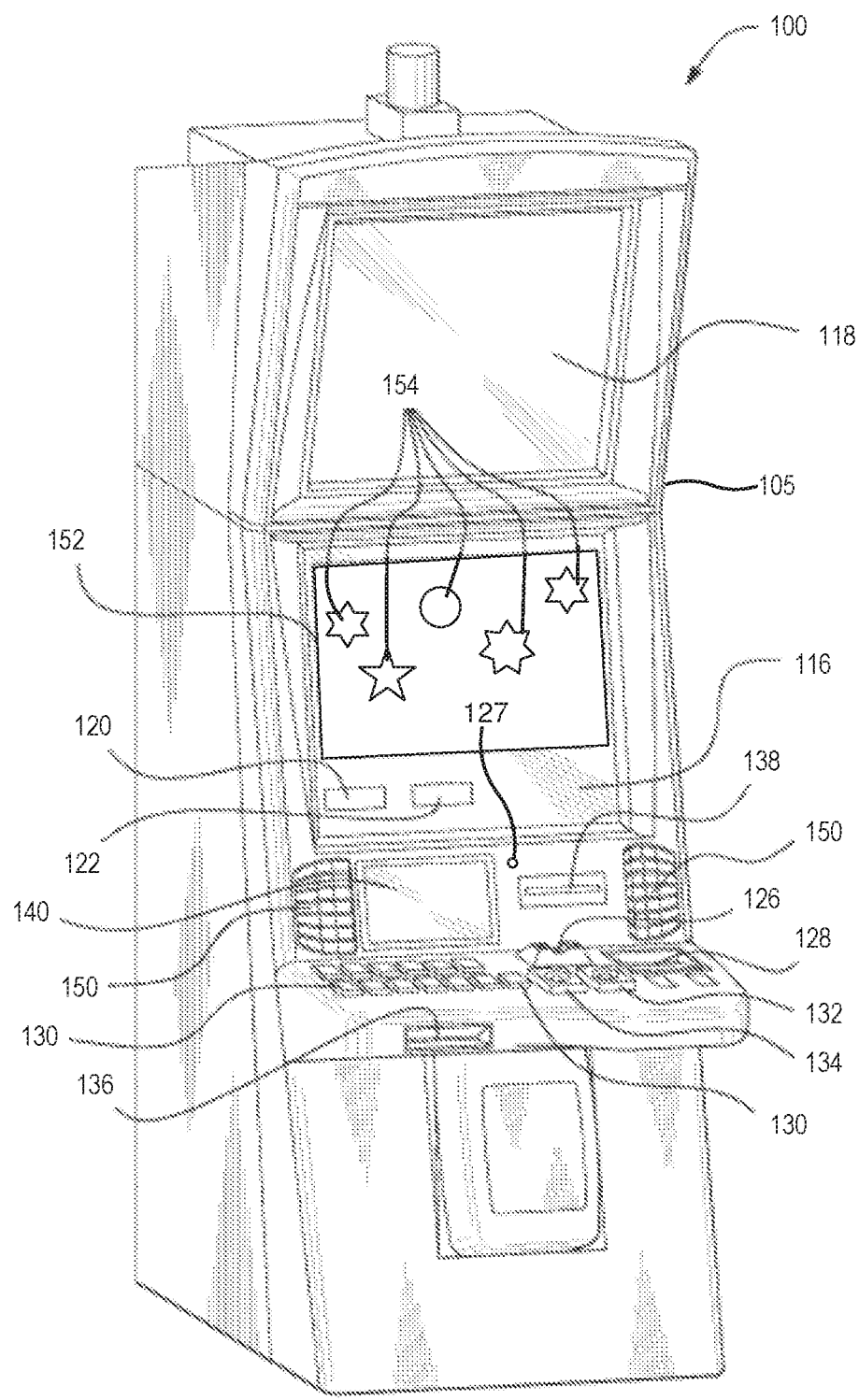
FIG. 7A is a perspective view of an electronic gaming device that can be configured according to some embodiments.
Figure 7B:
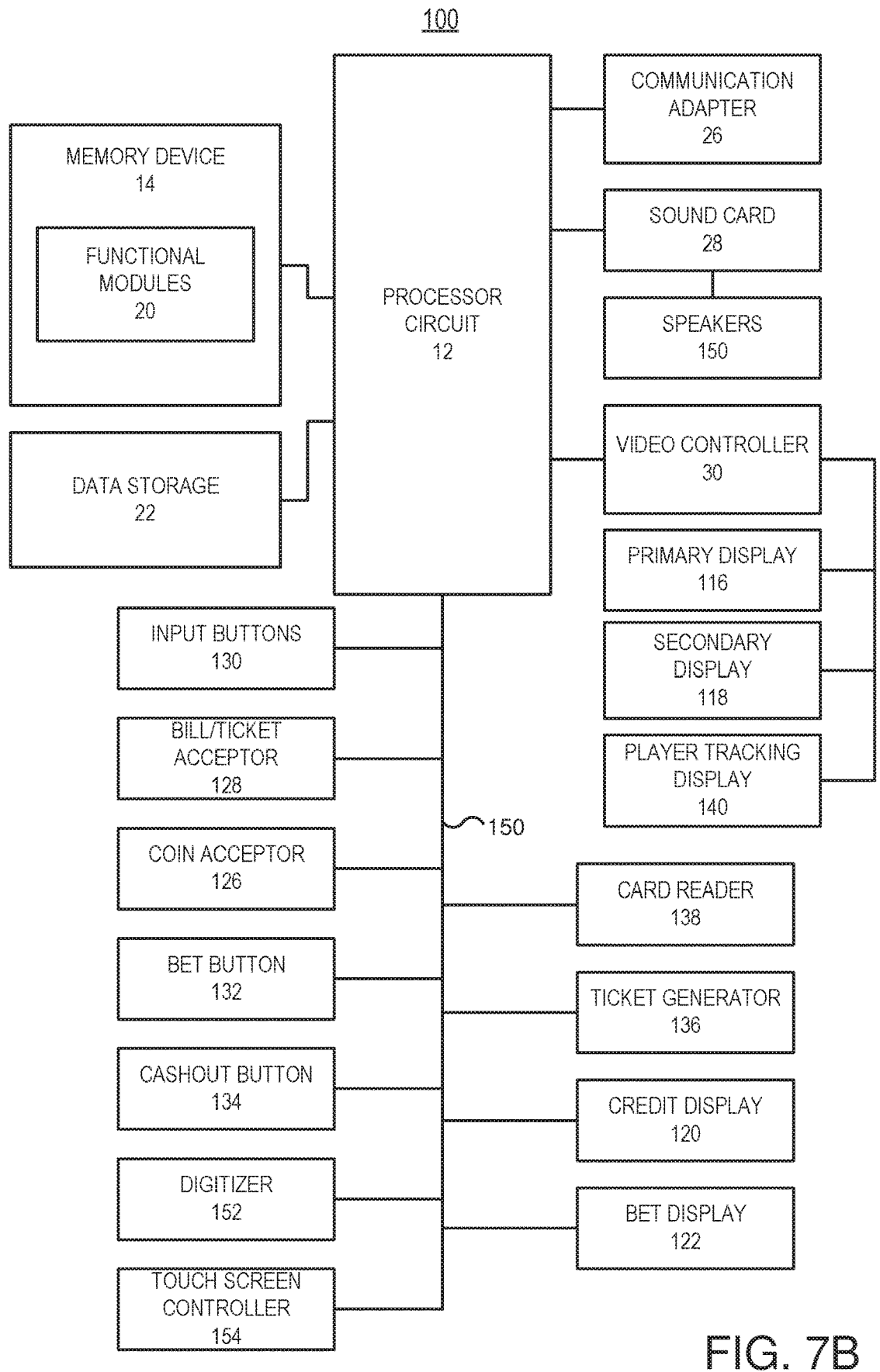
FIG. 7B is a schematic block diagram illustrating an electronic configuration for a gaming device according to some embodiments.

An example of an electronic gaming machine (EGM) that can use image file segments for authentication described herein according to various embodiments is illustrated in FIGS. 7A and 7B in which FIG. 7A is a perspective view of an EGM 100 illustrating various physical features of the device and FIG. 7B is a functional block diagram that schematically illustrates an electronic relationship of various elements of the EGM 100. The embodiments shown in FIG. 7A and to 7B are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 7A and 7B. For example, referring to FIG. 7A, an EGM 100 may include a support structure, housing or cabinet 105 which provides support for a plurality of displays, inputs, outputs, controls and other features that enable a player to interact with the EGM 100.

The EGM 100 illustrated in FIG. 7A includes a number of display devices, including a primary display device 116 located in a central portion of the cabinet 105 and a secondary display device 118 located in an upper portion of the cabinet 105. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered.

The player tracking display 140 may be used to display a service window that allows the player to interact with, for example, their player loyalty account to obtain features, bonuses, comps, etc. In other embodiments, additional display screens may be provided beyond those illustrated in FIG. 7A.

The EGM 100 may further include a number of input devices that allow a player to provide various inputs to the EGM 100, either before, during or after a game has been played. For example, the EGM 100 may include a plurality of input buttons 130 that allow the player to select options before, during or after game play. The EGM 100 may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 7A and 7B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may have a touch-sensitive display that includes a digitizer 152 and a touchscreen controller 154 (FIG. 7B). The player may interact with the EGM 100 by touching virtual buttons on one or more of the display devices 116, 118, 140. Accordingly, any of the above described input devices, such as the input buttons 130, the game play initiation button, which may also be referred to as a "Bet Button", 132 and/or the cashout button 134 may be provided as virtual buttons on one or more of the display devices 116, 118, 140.

Referring briefly to FIG. 7B, operation of the primary display device 116, the secondary display device 118 and the player tracking display 140 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30.

Referring again to FIG. 7A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touch-screen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include multiple different physical devices that are operable to receive monetary value from the player. In some embodiments, such devices include a ticket dispenser 136, a bill/ticket acceptor 128, and a coin acceptor 126 that allows the player to deposit coins into the EGM 100.

While not illustrated in FIG. 7A, the EGM 100 may also include a note dispenser configured to dispense paper currency and/or a coin generator configured to dispense coins or tokens in a coin payout tray.

The EGM 100 may further include one or more speakers 150 controlled by one or more sound cards 28 (FIG. 7B). The EGM 100 illustrated in FIG. 7A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 7B is a block diagram that illustrates logical and functional relationships between various components of an EGM 100. As shown in FIG. 7B, the EGM 100 may include a processor circuit 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor circuit 12 may be variously referred to as a "controller," "microcontroller," "microprocessor" or simply a "computer." The processor may further include one or more application-specific integrated circuits (ASICs).

Various components of the EGM 100 are illustrated in FIG. 7B as being connected to the processor circuit 12. It will be appreciated that the components may be connected to the processor circuit 12 through a system bus, a communication bus and controller, such as a USB controller and USB bus, a network interface, or any other suitable type of connection.

The EGM 100 further includes a memory device 14 that stores one or more functional modules. The memory device 14 may store program code and instructions, executable by the processor circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor circuit 12.

In some embodiments, the EGM 100 may include a sensor, such as a camera in communication with the processor circuit 12 (and possibly controlled by the processor circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processor circuit 12 may incorporate that image into the primary and/or secondary game as a game image, symbol or indicia.

Figure 7C:
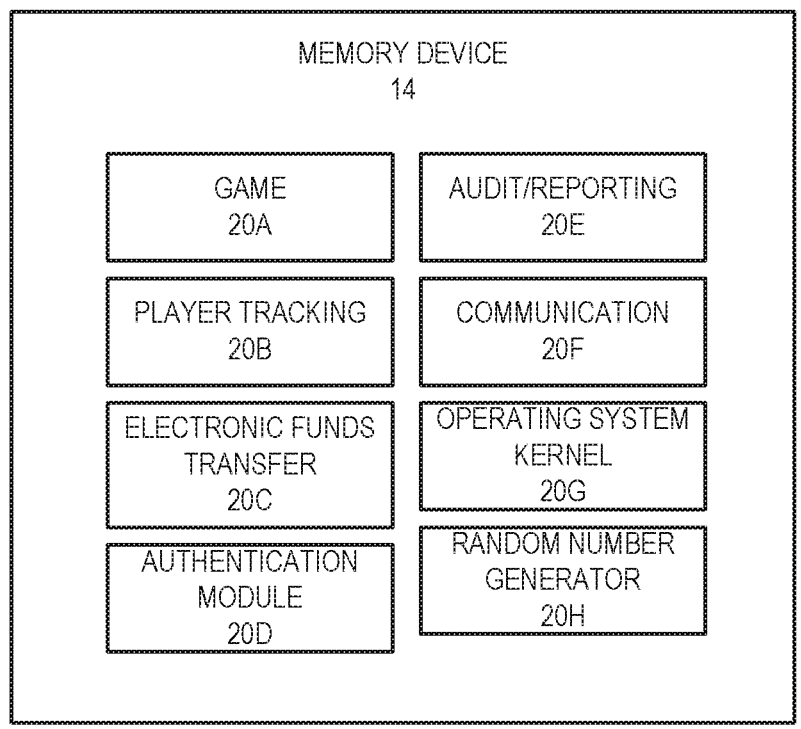
FIG. 7C is a schematic block diagram illustrating a memory device of FIGS. 7A and 7B.

Various functional modules of that may be stored in a memory device 14 of an EGM 100 are illustrated in FIG. 7C. Referring to FIG. 7C, the EGM 100 may include in the memory device 14 a game module 20A that includes program instructions and/or data for operating a hybrid wagering game as described herein. The EGM 100 may further include a player tracking module 20B, an electronic funds transfer module 20C, an authentication module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The authentication module 20D may perform authentication of image files as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

Figure 8:
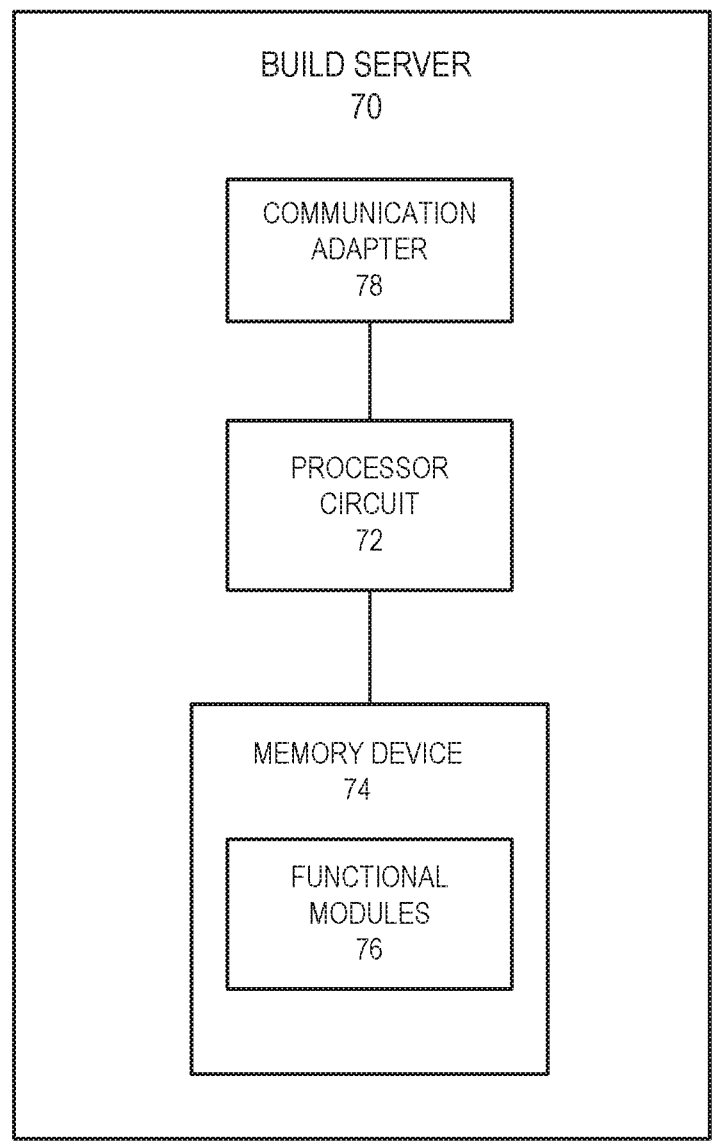
FIG. 8 is a schematic block diagram illustrating an electronic configuration for a build server according to some embodiments.

FIG. 8 is a block diagram that illustrates various components of a build server 70 according to some embodiments. As shown in FIG. 8, the build server 70 may include a processor circuit 72 that controls operations of the build server 70. Although illustrated as a single processor, multiple special purpose and/or general purpose processors and/or processor cores may be provided in the build server 70. For example, the build server 70 may include one or more of a video processor, a signal processor, a sound processor and/or a communication controller that performs one or more control functions therein. The processor 72 may be variously referred to as a "controller," "microcontroller," "microprocessor" or simply a "computer." The processor may further include one or more application-specific integrated circuits (ASICs).

Various components of the build server 70 are illustrated in FIG. 8 as being connected to the processor circuit 72. It will be appreciated that the components may be connected to the processor circuit 72 through a system bus, a communication bus and controller, such as a USB controller and USB bus, a network interface, or any other suitable type of connection.

The build server 70 further includes a memory device 74 that stores one or more functional modules 76 for performing the operations described above.

The memory device 74 may store program code and instructions, executable by the processor circuit 72, to control the build server 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The build server 70 may include a communication adapter 78 that enables the build server 70 to communicate with remote devices, such as EGMs 100 and/or a player tracking server over a wired and/or wireless communication network, such as a local area network (LAN), wide area network (WAN), cellular communication network, or other data communication network.

The build server 70 may include one or more internal or external communication ports that enable the processor circuit 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor circuit 72.

Figure 9:
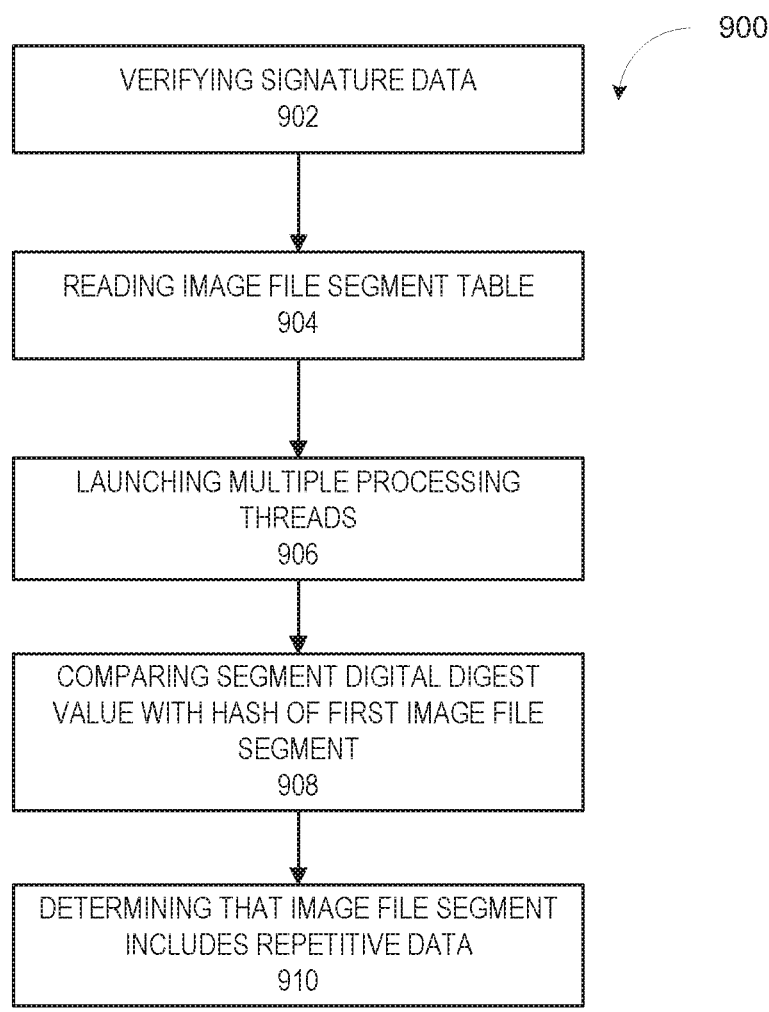
FIGS. 9-12 are flowcharts illustrating operations of systems/methods according to some embodiments.

FIGS. 9-12 are flowcharts illustrating operations of systems/methods/devices according to some embodiments. Referring now to FIG. 9, operations include verifying, using a public key, signature data that corresponds to a single certificate file for authenticating a software installation package file (block 902). In some embodiments, the software installation package may be referred to as an image file and was previously signed using a private source key. In some embodiments, in response to verifying that the signature data matches an originally signed single certificate file, operations include reading an image file segment table from the software installation package file (block 904). Some embodiments provide that the image file segment table includes multiple records that correspond to different ones of multiple image file segments of the software installation package file.

In some embodiments, operations include launching multiple processing threads that correspond multiple processor circuit processing cores (block 906). Some embodiments provide that each of the processing threads performs a hashing operation on a different one of the image file segments. In some embodiments, the image file segments include different types of image file segments. For example, a first type of image file segment includes non-repetitive data content and a second type of image file segment includes repetitive data content that includes a data value that is repeated throughout.

In some embodiments, a first record includes a segment digital digest value corresponding to a first image file segment, a first segment starting value and a first segment size corresponding to the first image file segment.

Some embodiments provide that operations further include comparing the segment digital digest value in the first record with a hash of the first image file segment (block 908).

In some embodiments, a second record includes a value of repetitive data, a second segment starting value and a second segment size corresponding to the second image file segment. Operations may further include determining that second image file segment includes the value of repetitive data repeated from the second segment starting value in the second image file segment for the second segment size (block 910). In some embodiments, determining that the second image file segment includes the value of repetitive data includes performing a byte by byte comparison to determine that the second image file segment includes only the value of repetitive data.

Figure 10:
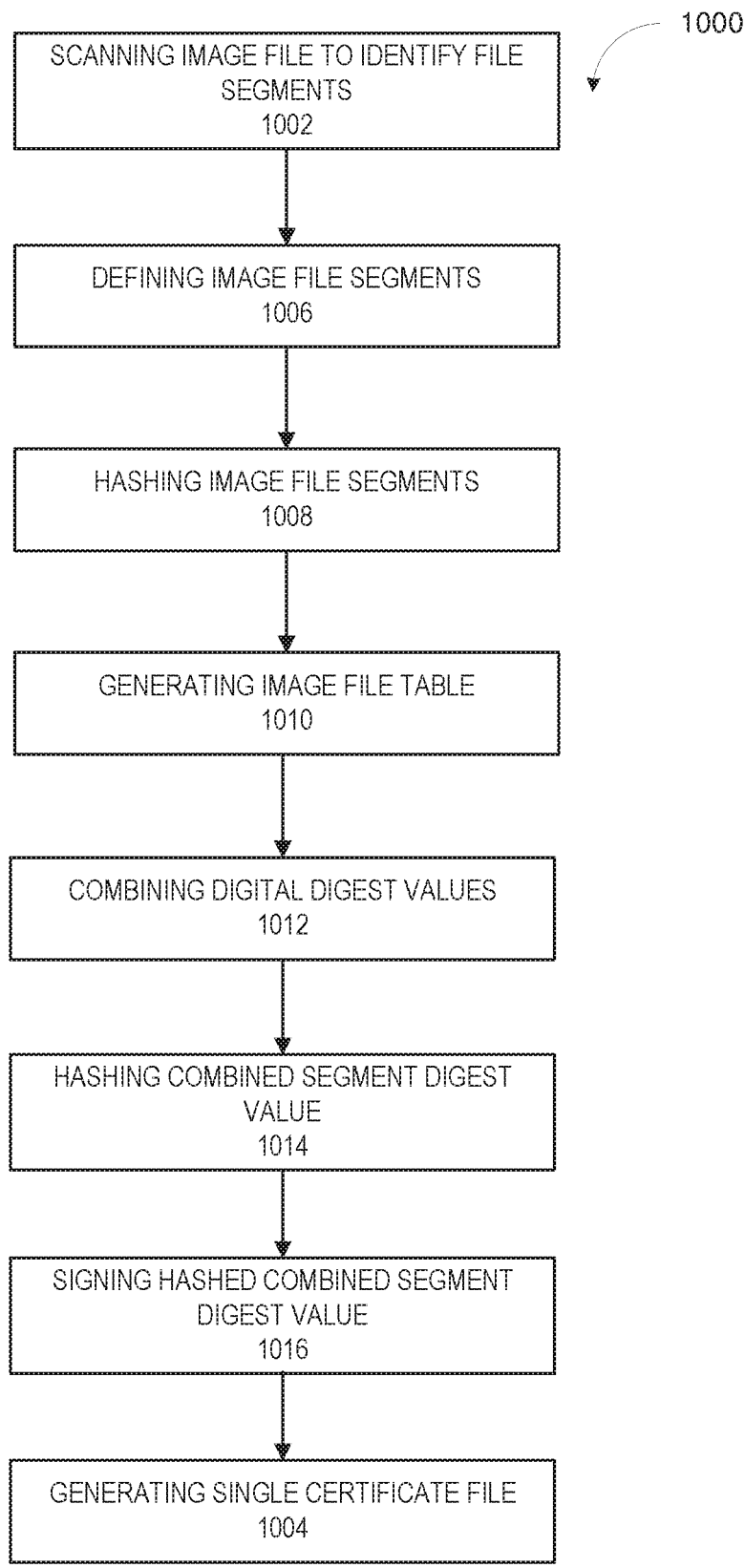

Referring now to FIG. 10, operations 1000 include scanning an image file that corresponds to a software installation package file to identify multiple image file segments therein (block 1002). Some embodiments further include defining the image file segments in the image file (block 1006). Some embodiments include hashing ones of the image file segments into multiple segment digital digest values (block 1008). In some embodiments, operations may include generating an image file segment table that includes multiple records corresponding to respective ones of the image file segments (block 1010). In some embodiments, the image file segment table is in the single certificate file.

According to some embodiments, operations include combining the segment digital digest values into a combined segment digital digest value (block 1012) and hashing the combined segment digest value to generate a hashed combined segment digest value (block 1014). Embodiments further include signing, using a private source key, the hashed combined segment digest value to generate the single certificate file (block 1016). Embodiments may include generating a single certificate file that corresponds to the multiple image file segments (block 1004).

In some embodiments, the image file segments include a first type of image file segments and a second type of image file segments that are different from the first type of image file segments. Some embodiments provide that the first type of image file segments includes repetitive data content and the second type of image file segments includes non-repetitive data content. In some embodiments, hashing ones of the image file segments includes only hashing ones of the first type of image file segments and not hashing ones of the second type of image file segments. In some embodiments, ones of the records corresponding to the first type of image file segments include the segment digital digest value and a first segment starting value. Some embodiments provide that ones of the records corresponding to the second type of image file segments include a value of repetitive data and a second segment starting value.

Figure 11:
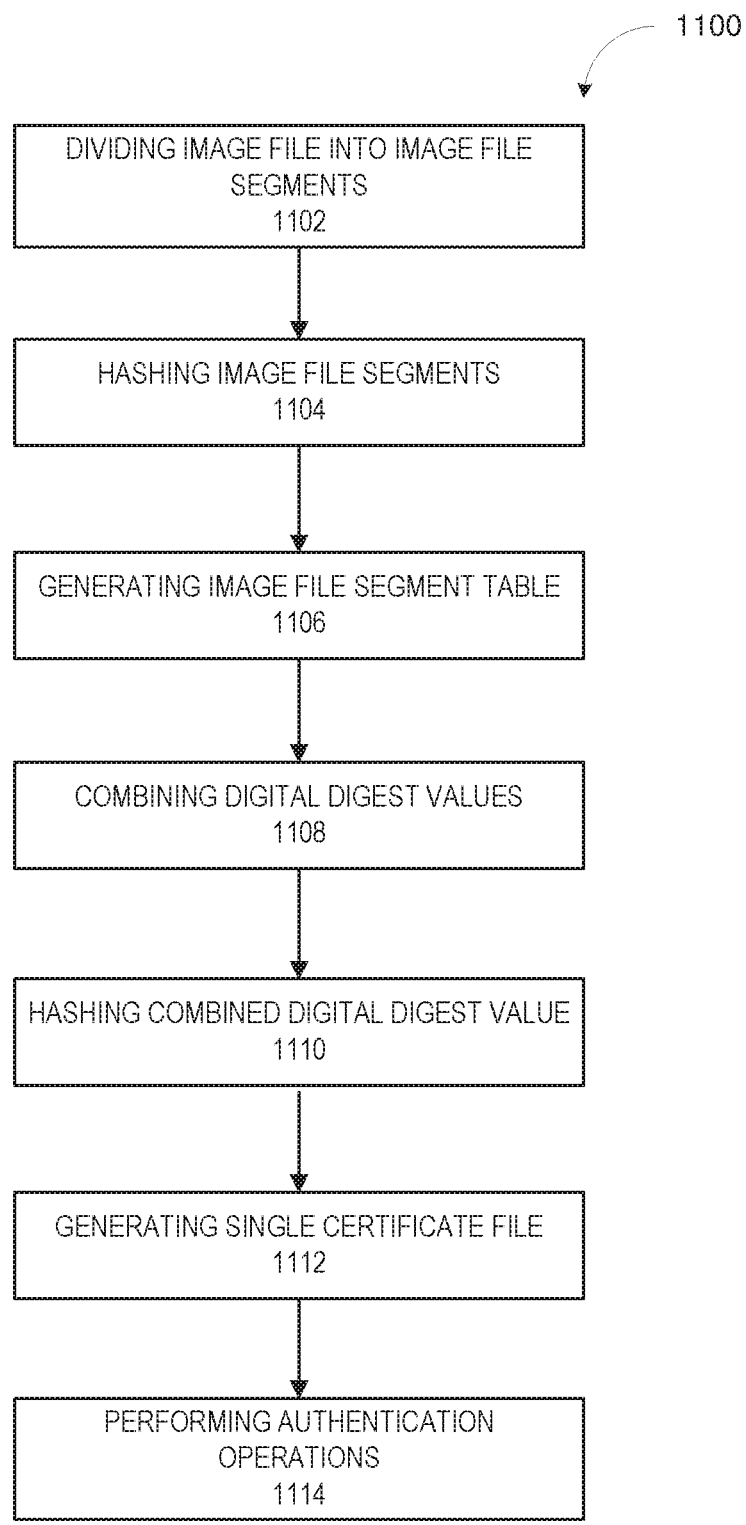
Figure 12:
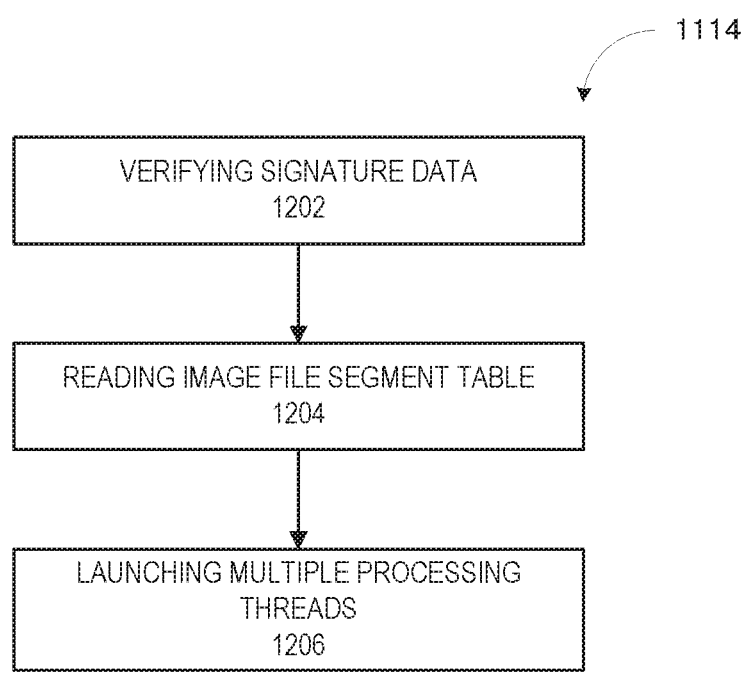

Referring to FIG. 11, operations 1100 include dividing an image file that corresponds to a software installation package file into multiple image file segments (block 1102), hashing ones of the image file segments into corresponding segment digital digest values (block 1104), and generating an image file segment table that includes records corresponding to each of the image file segments (block 1106). Operations may further include combining the segment digital digest values into a combined segment digital digest value (block 1108), hashing the combined digital digest value to generate a hashed combined segment digest value (block 1110), and generating a single certificate file by digitally signing the hashed combined segment digest value using a private source key (block 1112).

Operations may further include performing authentication operations (block 1114). For example, brief reference is made to FIG. 12, which is a block diagram illustrating operations for performing authentication operations of block 1114 in FIG. 11 according to some embodiments. Authentication operations include verifying, using a public key, that signature data corresponding to the single certificate file was signed using a private key (block 1202), reading the image file segment table that includes the records corresponding to each of the image file segments (block 1204), and launching multiple processing threads that correspond multiple processor circuit processing cores (block 1206). In some embodiments, each of the processing threads performs a hashing operation on a different one of the image file segments.

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the embodiments disclosed herein, and that modifications to the disclosed embodiments, as well as other embodiments, are intended to be included within the scope of the appended claims. The present inventive concept is defined by the following claims.

What is claimed is:

1. A server comprising:
a processor circuit; and
a memory coupled to the processor circuit, wherein the memory comprises computer program instructions that, when executed by the processor circuit, cause the server to perform operations comprising:
verifying, using a public key, signature data corresponding to a single certificate file for authenticating a software installation package file that was signed using a private source key; and
responsive to verifying that the signature data matches an originally signed single certificate file, reading an image file segment table from the software installation package file, the image file segment table comprising a plurality of records that correspond to ones of a plurality of image file segments of the software installation package file,
wherein the server is further caused to perform operations comprising launching a plurality of processing threads that correspond a plurality of processor circuit processing cores, wherein each of the plurality of processing threads performs a hashing operation on a different one of the plurality of image file segments.

2. The server of claim 1, wherein the plurality of image file segments comprises a first type of image file segments and a second type of image file segments that is different from the first type of image file segments.

3. The server of claim 2, wherein the second type of image file segments comprises repetitive data content and the first type of image file segments comprises non-repetitive data content.

4. The server of claim 3, wherein a first record of the plurality of records comprises a segment digital digest value corresponding to a first image file segment of the plurality of image file segments, a first segment starting value and a first segment size corresponding to the first image file segment.

5. The server of claim 4, wherein the server is further caused to perform operations comprising comparing the segment digital digest value in the first record with a hash of the first image file segment.

6. The server of claim 4, wherein a second record of the plurality of records comprises a value of repetitive data, a second segment starting value and a second segment size corresponding to the second image file segment.

7. The server of claim 6, wherein the server is further caused to perform operations comprising determining that second image file segment comprises the value of repetitive data repeated from the second segment starting value in the second image file segment for the second segment size.

8. The server of claim 7, wherein determining that the second image file segment comprises the value of repetitive data comprises performing a byte by byte comparison to determine that the second image file segment comprises only the value of repetitive data.

9. A server comprising:
a processor circuit; and
a memory coupled to the processor circuit, wherein the memory comprises computer program instructions that, when executed by the processor circuit, cause the server to perform operations comprising:
scanning an image file that corresponds to a software installation package file to identify a plurality of image file segments therein; and
generating a single certificate file that corresponds to the plurality of image file segments,
wherein the server is further caused to perform operations comprising:
based on the scanning, defining the plurality of image file segments in the image file;
hashing ones of the plurality of image file segments into a corresponding plurality of segment digital digest values,
combining the plurality of segment digital digest values into a combined segment digital digest value; and
hashing the combined segment digest value to generate a hashed combined segment digest value.

10. The server of claim 9, wherein the server is further caused to perform operations comprising generating an image file segment table comprising a plurality of records corresponding to respective ones of the plurality of image file segments, and wherein the single certificate file comprises the image file segment table.

11. The server of claim 9, wherein the server is further caused to perform operations comprising signing, using a private source key, the hashed combined segment digest value to generate the single certificate file.

12. The server of claim 9, wherein the plurality of image file segments comprises a first type of image file segments and a second type of image file segments that are different from the first type of image file segments.

13. The server of claim 12, wherein the first type of image file segments comprises repetitive data content and the second type of image file segments comprises non-repetitive data content.

14. The server of claim 13, wherein hashing ones of the plurality of image file segments comprises only hashing ones of the first type of image file segments, wherein ones of the plurality of records corresponding to the first type of image file segments comprise a segment digital digest value and a first segment starting value, and wherein the ones of the plurality of records corresponding to the second type of image file segments comprise a value of repetitive data and a second segment starting value.

15. A method, comprising:
dividing an image file that corresponds to a software installation package file into a plurality of image file segments;
hashing ones of the plurality of image file segments into a corresponding plurality of segment digital digest values;
generating an image file segment table that comprises records corresponding to each of the plurality of image file segments;
combining the plurality of segment digital digest values into a combined segment digital digest value;
hashing the combined digital digest value to generate a hashed combined segment digest value; and
generating a single certificate file by digitally signing the hashed combined segment digest value using a private source key.

16. The method of claim 15, further comprising:
performing authentication operations comprising:
verifying, using a public key, that signature data corresponding to the single certificate file was signed using a private key;
reading the image file segment table that comprises the records corresponding to each of the plurality of image file segments; and
launching a plurality of processing threads that correspond a plurality of processor circuit processing cores, wherein each of the plurality of processing threads performs a hashing operation on a different one of the plurality of image file segments.

\* \* \* \* \*